United States Patent
Pan

(10) Patent No.: US 8,575,907 B2
(45) Date of Patent: Nov. 5, 2013

(54) PREDICTABLE METHOD FOR REDUCING POWER CONSUMPTION DURING PEAK DEMAND

(76) Inventor: Yang Pan, Shanghai (CN)

(*) Notice: Subject to any disclaimer, the term of this patent is extended or adjusted under 35 U.S.C. 154(b) by 146 days.

(21) Appl. No.: 13/313,014

(22) Filed: Dec. 7, 2011

(65) Prior Publication Data

US 2013/0147450 A1    Jun. 13, 2013

Related U.S. Application Data

(62) Division of application No. 13/313,010, filed on Dec. 7, 2011.

(51) Int. Cl.
*H05B 6/08* (2006.01)
*G05F 1/571* (2006.01)

(52) U.S. Cl.
USPC ............ 323/276; 219/667; 323/274; 327/513

(58) Field of Classification Search
USPC .............. 219/660, 661, 667, 668; 322/33, 34; 323/274, 276, 907, 294; 327/138, 512, 327/513; 336/55, 57–62, 179; 363/50–54
See application file for complete search history.

(56) References Cited

U.S. PATENT DOCUMENTS

| | | | |
|---|---|---|---|
| 4,706,180 A | 11/1987 | Wills | |
| 5,064,296 A * | 11/1991 | Huijsing et al. | 374/163 |
| 5,118,964 A * | 6/1992 | McArdle | 307/117 |
| 5,408,401 A * | 4/1995 | Miyazaki | 363/21.08 |
| 6,972,969 B1 | 12/2005 | Shteynberg et al. | |
| 7,761,274 B1 * | 7/2010 | Pippin | 703/14 |
| 2009/0052212 A1 | 2/2009 | Lee | |
| 2010/0110734 A1 | 5/2010 | Park | |

OTHER PUBLICATIONS

Y. Pan and J.H. Huijsing,"New integrated gas flow sensor with duty cycle output", Electronic Letters, vol. 24, No. 9, Apr. 28, 1988; pp. 542-543.
Y. Pan, F.R. Riedijk and J.H. Huijsing, "A new class of integrated thermal oscillators with duty-cycle output for application in thermal sensors", Sensor and Actuators, vol. A21-23, pp. 655-657, 1990.

* cited by examiner

*Primary Examiner* — Adolf Berhane
*Assistant Examiner* — Gary Nash

(57) ABSTRACT

System and method for reducing power consumption during peak demand period is disclosed. A consumption unit comprises a power limiter. An AC power limiter converts a portion of AC power into heat and generates an output for a temperature sensor. A comparator has one of the inputs as the output of the temperature sensor and another input as a reference generated by a controller. A feedback loop is established by connecting output of the comparator to secondary winding of a power transformer through a switch. A DC power limiter is also disclosed.

19 Claims, 5 Drawing Sheets

US 8,575,907 B2

PREDICTABLE METHOD FOR REDUCING POWER CONSUMPTION DURING PEAK DEMAND

CROSS-REFERENCE TO RELATED APPLICATIONS

This application is a division of the application with Ser. No. 13/313,010.

BACKGROUND

1. Field of Invention

This invention relates to a power distribution system, specifically to a power distribution system including a means of reducing peak demand.

2. Description of Prior Art

A utility distributes electricity to consumption units such as residential and commercial units through power grids and sub-grids. The consumption units do not always consume power at a constant rate. In some instances, the utility may experience periods of peak power demand that are greater than the average power demand. In order to satisfy the power demand during periods of peak demand, the utility may operate at or near to maximum capacity, it may operate supplemental generators, and/or it may purchase electricity from other sources. When the electrical distribution system runs near capacity, there is a potential that the system may fail, and operating supplemental generators and purchasing electricity from other sources may increase the utility's operating costs and may have a significant negative environmental impact.

As a result, methods have been adopted by utility to discourage power consumption during peak demand period. The utility may charge a consumption unit a premium for peak electricity demand. For example, the premium may take a form of higher average rates and/or additional charges based on the consumer's peak demand. Effectiveness of such an approach depends largely on awareness of consumers on the price and their willingness to take appropriately actions and is essentially unpredictable.

It is desirable to have a predictable method for reducing the peak demand of the power consumptions.

SUMMARY OF THE INVENTION

It is therefore an object of the present invention to provide a predictable method for managing peak power demand by limiting power consumptions in selected consumption units.

It is another object of the present invention to provide programmable power limiters that are suitable to be implemented in the residential and commercial units.

It is yet another object of the present invention to provide a control and communication method for controlling the peak power demand of a power distribution system.

The power distribution system comprises a power grid, a control unit and many consumption units. The consumption unit further comprises a power limiter. The control unit sends instructions through a communication network to a group of selected consumption units during peak demand period. The selected consumption units may have agreements with the utility to limit the power consumption during peak demand period. After receiving the instructions, the consumption units activate the power limiters. Power consumptions for appliances in the units are adjusted according to predetermined rules to meet the power limitation.

According to one embodiment, the power limiter is implemented in AC power domain. According to another embodiment, the power limiter is implemented in DC power domain.

BRIEF DESCRIPTION OF THE DRAWINGS

For a more complete understanding of the present invention and its various embodiments, and the advantages thereof, reference is now made to the following description taken in conjunction with the accompanying drawings.

DETAILED DESCRIPTION

The present invention will now be described in detail with references to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
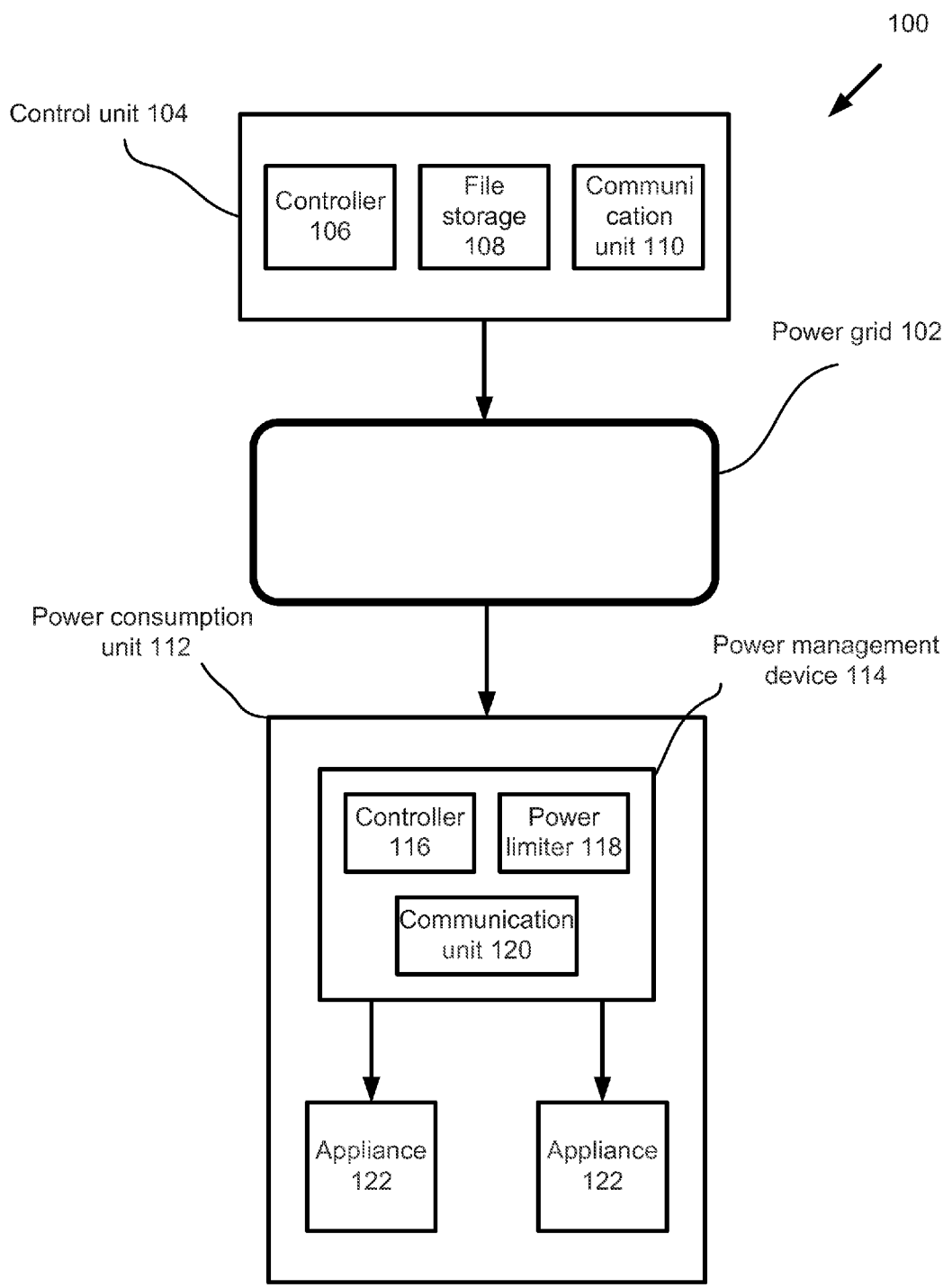
FIG. 1 shows, in a schematic diagram, an exemplary power distribution system.

FIG. 1 is a schematic diagram of an exemplary power distribution system. System 100 comprises a power grid 102. Control unit 104 of a utility controls operation of power distribution system 100. Control unit 104 further comprises controller 106, file storage 108 and communication unit 110. Control unit 104 may be one or more computing systems.

System 100 further comprises multiple consumption units. The consumption units may be residential units or commercial units or be any unit that consumes electricity drawn from power grid 102. An exemplary consumption unit 112 is shown in FIG. 1. Consumption unit 112 comprises power management device 114 and appliances 122. Appliances are apparatus that consume electrical power. Appliances include but are not limited to refrigerators, air-conditioners, TV systems, computers, lamps and HiFi audio systems. For a commercial unit, appliances may include production equipments. Consumption unit 112 may include many different types of appliances.

Power management device 114 further comprises controller 116, power limiter 118 and communication unit 120. Controller 116 may be a computing system. Power limiter 118 is a device that limits the maximum power consumption of consumption unit 112. Power limiter 118 may be controlled by controller 116. The maximum power may be changeable as programmed by controller 116. Power limiter 118 is in a sleep mode before it is activated by controller 116. Communication unit 120 and communication unit 110 may form a communication network.

An instruction for limiting power consumption may be initiated by controller 106 when a peak demand period is encountered or is anticipated. Controller 106 retrieves a pre-stored agreement with consumption unit 112 and determines a maximum power consumption value. Communication unit 110 transmits an instruction to the communication unit 120.

After receiving the instruction, controller 116 activates power limiter 118 to limit power consumption of consumption unit 112. As a result, some of appliances 122 may be switched off, some may be operated in a reduced power mode and some may not be allowed to be switched on if they are being switched off.

Units 110 and 120 may form an ad hoc communication network including but not limited to 1) a Bluetooth (IEEE 802.15.1) type of network; 2) a ZigBee (IEEE 802.15.4) type of network; and 3) a Wi-Fi (IEEE 802.11) type of network. Units 110 and 120 may also be connected to the Internet or to a telephone network. Units 110 and 120 may also be a part of a communication network conforming to a Power Line Communication protocol. Power Line Communication or Power Line Carrier (PLC), also known as Power Line Digital Subscriber Line (PDSL) is a system for carrying data on a conductor also used for electrical power transmission.

Power limiter 118 may be implemented in AC or in DC power domain. Present inventive concept does not limit types or scopes of the power limiters. Any implementation of the power limiting concept will fit into the present inventive concept.

Figure 2:
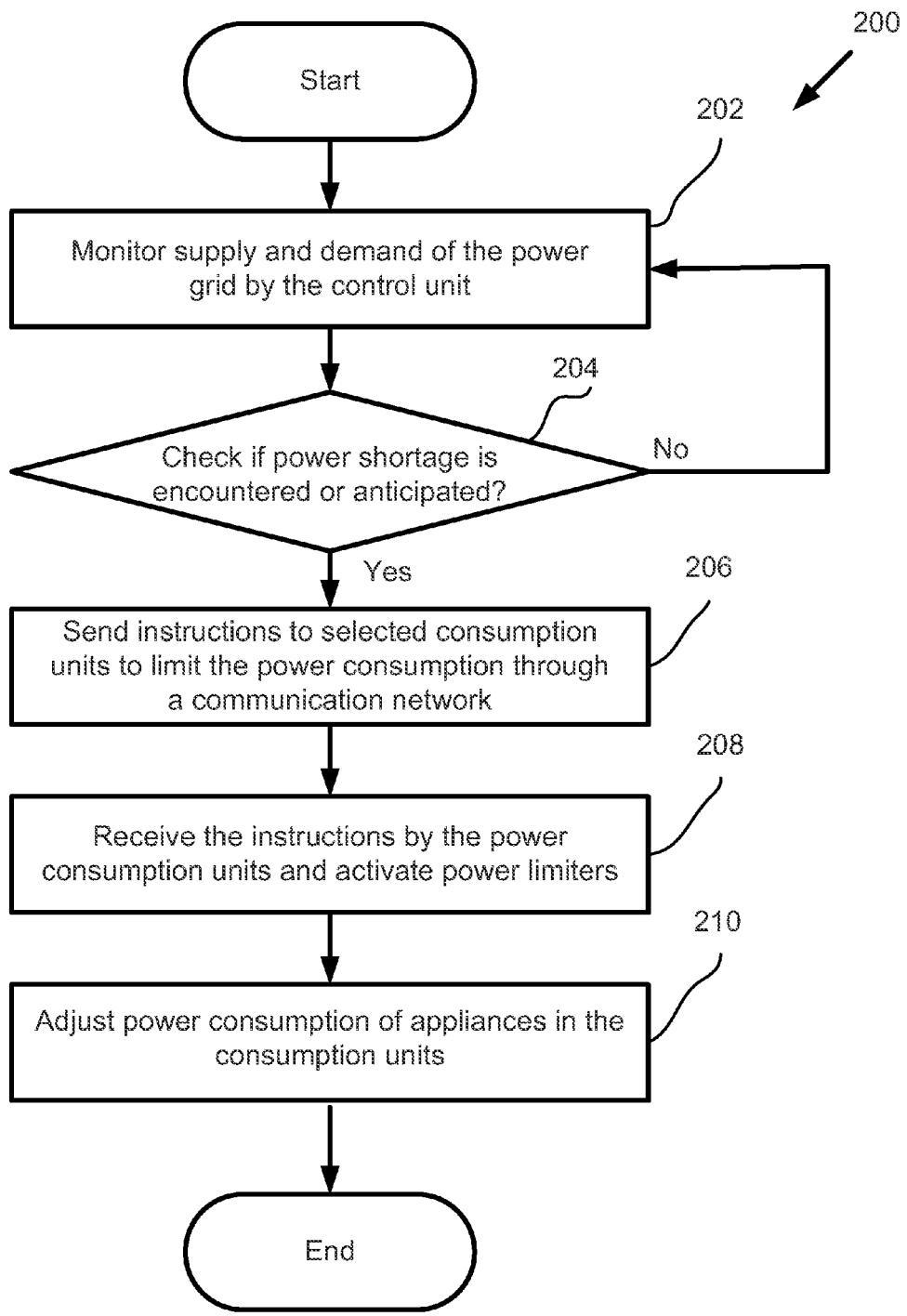
FIG. 2 shows, in a flowchart, a predictable method of limiting peak power demand.

FIG. 2 is a flowchart illustrating exemplarily the predictable method (200) of managing the peak power demand. Control unit 104 monitors supply and demand of power grid 102 continuously (202). If a power shortage situation is encountered or is anticipated as a result of such as peak demand period (204), instructions will be sent from control unit 104 to the selected consumption units 112 through a communication network (206).

The selected units may have pre-agreements with the utility through a commercial agreement for accepting power consumption limitation during the peak demand period. There may be various implementations of such commercial agreements that include but are not limited to: (1) a price discount for total electricity bill; (2) a credit for consuming a predetermined amount of electricity at a discounted rate at a low power consumption period; and (3) free or at a discount for consuming the electricity power with the accepted limit during the peak demand period. The agreements may be established through an auction. The auction may utilize the communication network. The auction may also use the Internet. Consumers of the consumption units may place a bid through the communication network. Auction results including identities and the agreed maximum electricity values for the consumption units may be stored in a file storage unit of the control unit.

Power management device 114 receives the instruction through communication unit 120 (208). As a result, controller 116 activates power limiter 118 to limit the maximum power consumption of the unit. Controller 116 adjusts power consumption of various appliances according to a program stored in a storage unit of controller 116 (210). Controller 116 may switch off one or more appliances. Controller 116 may also reduce power consumptions of one or more appliances (e.g. increase setting temperature of an air conditioner during summer peak hours). Controller 116 may deactivate power limiter 118 after receiving another instruction from control unit 104 that the power limitation requirement is expired.

Figure 3:
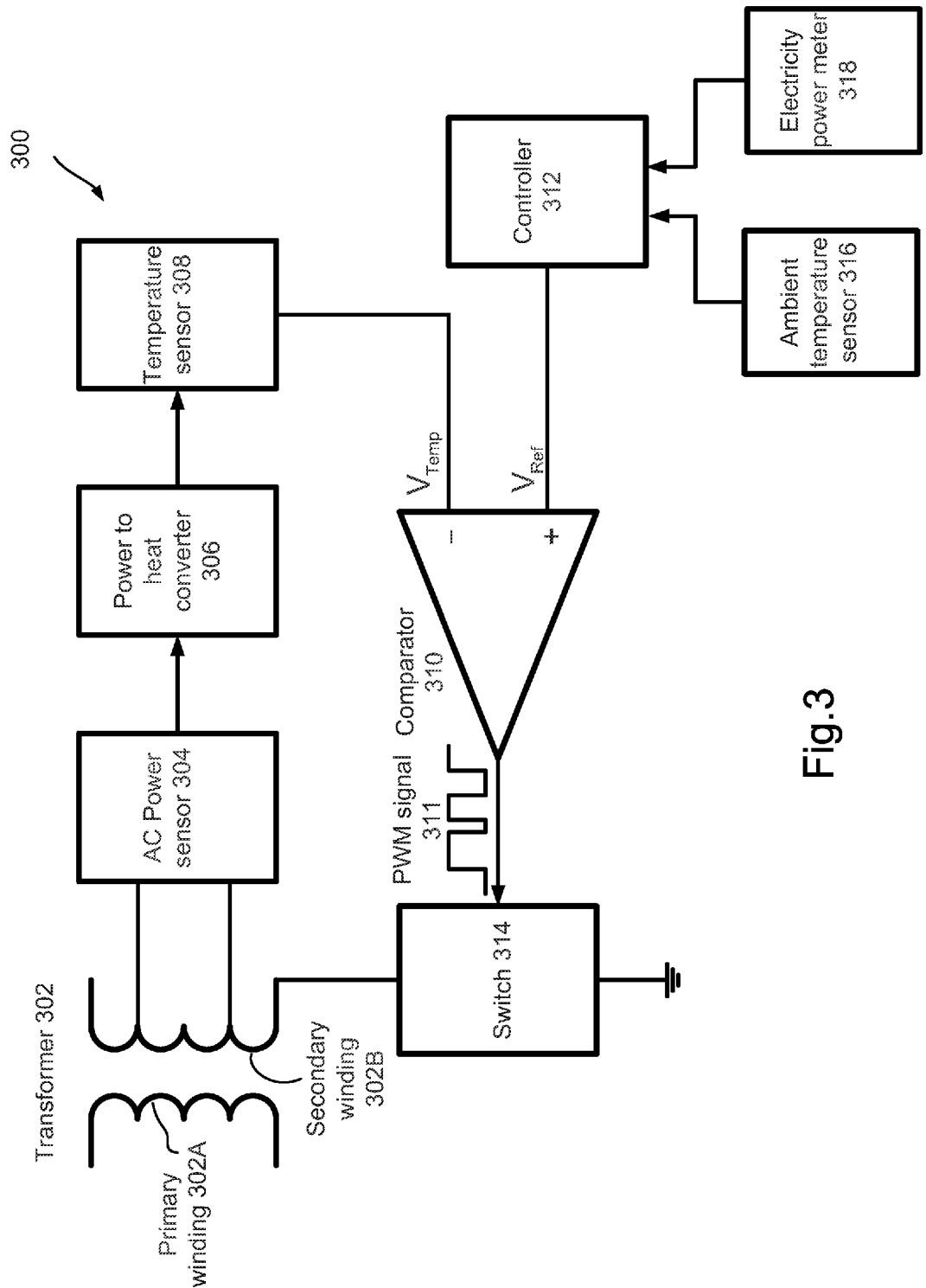
FIG. 3 shows, in a schematic diagram, an exemplary implementation of an AC power limiter.

FIG. 3 is an exemplary power limiter implemented in AC power domain based upon an integrated circuit for measurements of thermal signals comprising a thermal feedback loop.

Such an implementation is known from an article by Pan (the present inventor) and Huijsing in Electronic Letters 24 (1988), 542-543. This circuit is theoretically appropriate for measuring physical quantities such as speed of flow, pressure, IR-radiation, or effective value of electrical voltage or current (RMS), the influence of the quantity grated integrated circuit (chip) to its environment being determined in these cases. In these measurements, a signal conversion takes place twice: from physical (speed of flow, pressure, IR-radiation or RMS value) to the thermal domain, and from the thermal to the electrical domain.

This known semiconductor circuit theoretically consists of a heating element, integrated in the circuit, and a temperature sensor. The power dissipated in the heating element is measured with the help of an integrated amplifier unit, an amplifier with a positive feedback loop being used, because of which the temperature oscillates around a constant value with small amplitude. In the known circuit the temperature will oscillate in a natural way because of the existence of a finite transfer time of the heating element and the temperature sensor with a high amplifier-factor.

FIG. 3 shows a novel implementation of the thermal feedback principle as mentioned above to AC power limiter 300. AC power limiter 300 comprises a transformer 302 including primary winding 302A and secondary winding 302B. Transformer 302 converts AC power with high amplitude in primary winding 302A to AC power with low amplitude in secondary winding 302B while maintaining the power almost constant. AC Power sensor 304 coupled to secondary winding 302B receives a portion of AC power proportionally. Power sensor 304 may further comprise a current sensor and/or a voltage sensor. The received AC power is further coupled to power to heat converter 306 that may include a heating element. The heating element may be a heating resistor in an exemplary case. The heating element may also be an active component. Power to heat converter 306 (heating element) may be a part of an integrated circuit or a chip. According to a different implementation, a rectifier (not shown in FIG. 3) may be used to convert the AC power into DC power before it is used to heat the heating element.

Temperature sensor 308 in the same integrated circuit is used to measure the temperature of the integrated circuit (chip). According to one implementation of the present invention the heating element and temperature sensor may be placed in a microstructure such as a membrane or a cantilever beam, manufactured by a micromachining technology.

Output of temperature sensor 308 is coupled to one input of comparator 310. Reference generated by controller 312 is coupled to another input of comparator 310. Output of comparator 310, which is a Pulse-Width Modulation (PWM) signal, is coupled to switch 314 that is connected to secondary winding 302B of transformer 302 to form a positive feedback loop. Switch 314 may be implemented in various forms as known in the art. Switch 314 maybe a power Metal Oxide Semiconductor Field Effect Transistor (MOSFET) according to an implementation. Switch 314 may be a bipolar transistor according to another implementation. Switch 314 may even be a Light Emitting Diode (LED) and a photo detector. The output of comparator 310 may be used to drive the LED to emit light that will be detected by the photo detector. As soon as the measured temperature by temperature sensor 308 exceeds a predetermined value, set by the reference, the output of the comparator switches off switch 314. As a result, power sensor 304 receives no power from secondary winding 302B and the output of temperature sensor 308 starts to drop. As soon as the output is below the reference, the output of comparator 310 switches on switch 314 and therefore secondary winding 302B. The temperature of the chip or the microstructure will oscillate around a small value. The output power of secondary winding 302B will remain as a constant in a sine wave form modulated by the PWM signals. The output power of transformer 302 is limited by the duty cycle of the PWM signal. The output power may be delivered to appliances 122 of consumption unit 112.

The maximum output power of transformer 302 is determined by the reference that sets a level of temperature that the chip or the microstructure will oscillate around. To sustain a higher temperature, the power sensor will need to draw more power from the secondary winding 302B. The reference is determined by controller 312 that receives the instructions from control unit 104. In an unlimited power operation mode, controller may 312 my set the reference to a sufficiently high level to maintain switch 314 in an "on" state.

It should be noted that the temperature level of the microstructure or the chip also depends on ambient temperature. At a lower ambient temperature, it requires more power to heat the heating element to maintain the temperature to oscillate around the predetermined level. At a higher ambient temperature, less power is required. In one aspect of the present invention, an ambient temperature sensor 316 is used to measure the ambient temperature. The measurement results are sent to controller 312. Controller 312 determines the reference based upon not only the instructions from control unit 104 but also the ambient temperature measured by temperature sensor 316. Temperature sensor 316 may be a sensor independent of the integrated circuit or the chip. Temperature sensor 316 may also be a part of the integrated circuit or the chip that will require an appropriate thermal isolation between temperature sensor 306 and temperature sensor 316. Such thermal isolation techniques are known in the art.

According to another implementation, system 300 may further comprise an electricity meter 318 as an option although inclusion of 3118 is not essential for its operations. Electricity meter 318 provides an independent means of measuring the output power of transformer 302. Controller 312 receives output of electricity meter 318 and adjusts accordingly the reference to meet the power consumption limitation set by control unit 104. Electricity meter 318 is an electronic meter in a preferred form.

There may be different implementations of integration level of system 300. At a minimum level, 306 and 308 are integrated in a single chip or in a single microstructure. At a higher level, 310 may also be integrated (e.g. 306, 308 and 310 in a single chip). At even higher levels, 312 and 314 may also be integrated (e.g. 306, 308, 310, 312 and 314 in a single chip). At still higher level, 316 and 318 may also be integrated (e.g. 306, 308, 310, 312, 314, 316 and 318 in a single chip). All such variations shall fall within scope of inventive concepts of the present invention.

Figure 4:
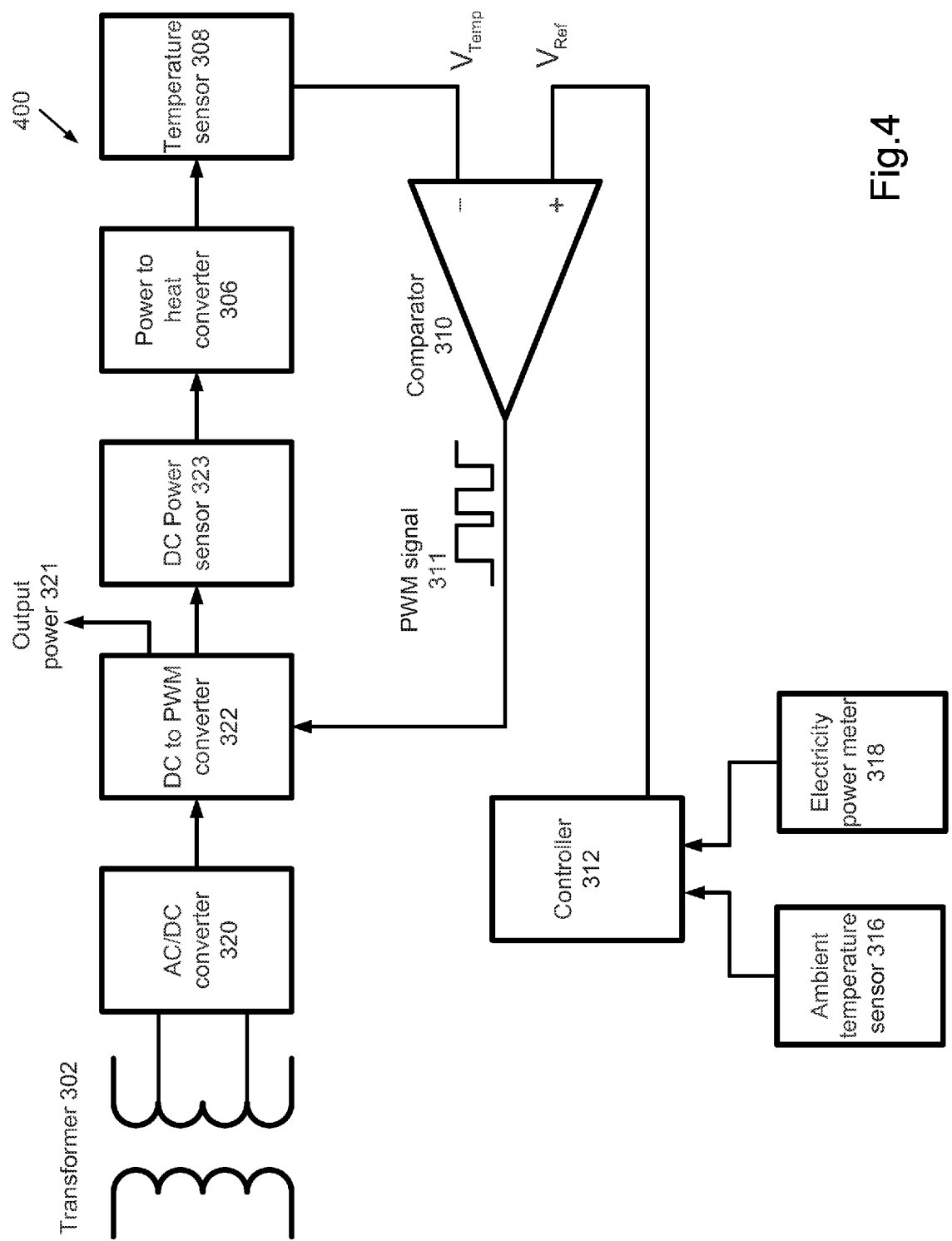
FIG. 4 shows, in a schematic diagram, an exemplary implementation of a DC power limiter with AC power source.

FIG. 4 shows an exemplary power limiter implemented in DC power domain with AC power source. System 400 comprises AC/DC converter 320 that converts output power of transformer 302 from AC form into DC form. Block 322 modulates the DC power by PWM signal 311. DC power sensor 323 is coupled to Block 322 to draw a portion of DC power proportionally. Block 322 delivers output power 321 in PWM form. The DC power received by DC power sensor 323 is coupled to power to heat converter (heating element) 306. Temperature sensor 308 measures temperature of the microstructure (chip) that includes the heating element. Comparator 310 takes one input from the output of temperature sensor 308 and takes another input from a reference generated from controller 312. Output of comparator 310 in PWM form (311) is coupled to block 322 to modulate the DC power. The temperature of the chip will oscillate around a small value set by the reference. Block 322 converts output of AC/DC converter 320 into DC power in PWM form. The output power of block 322 is therefore determined by duty cycle of the PWM signal while the amplitude is kept constant. The output power of block 322 may be further processed into DC and/or AC powers before it is delivered to appliances.

Controller 212 is coupled to ambient temperature sensor 216 and electricity meter 216. Functionalities of 216 and 218 are similar to ones that have been described previously in the AC power limiter session.

Figure 5:
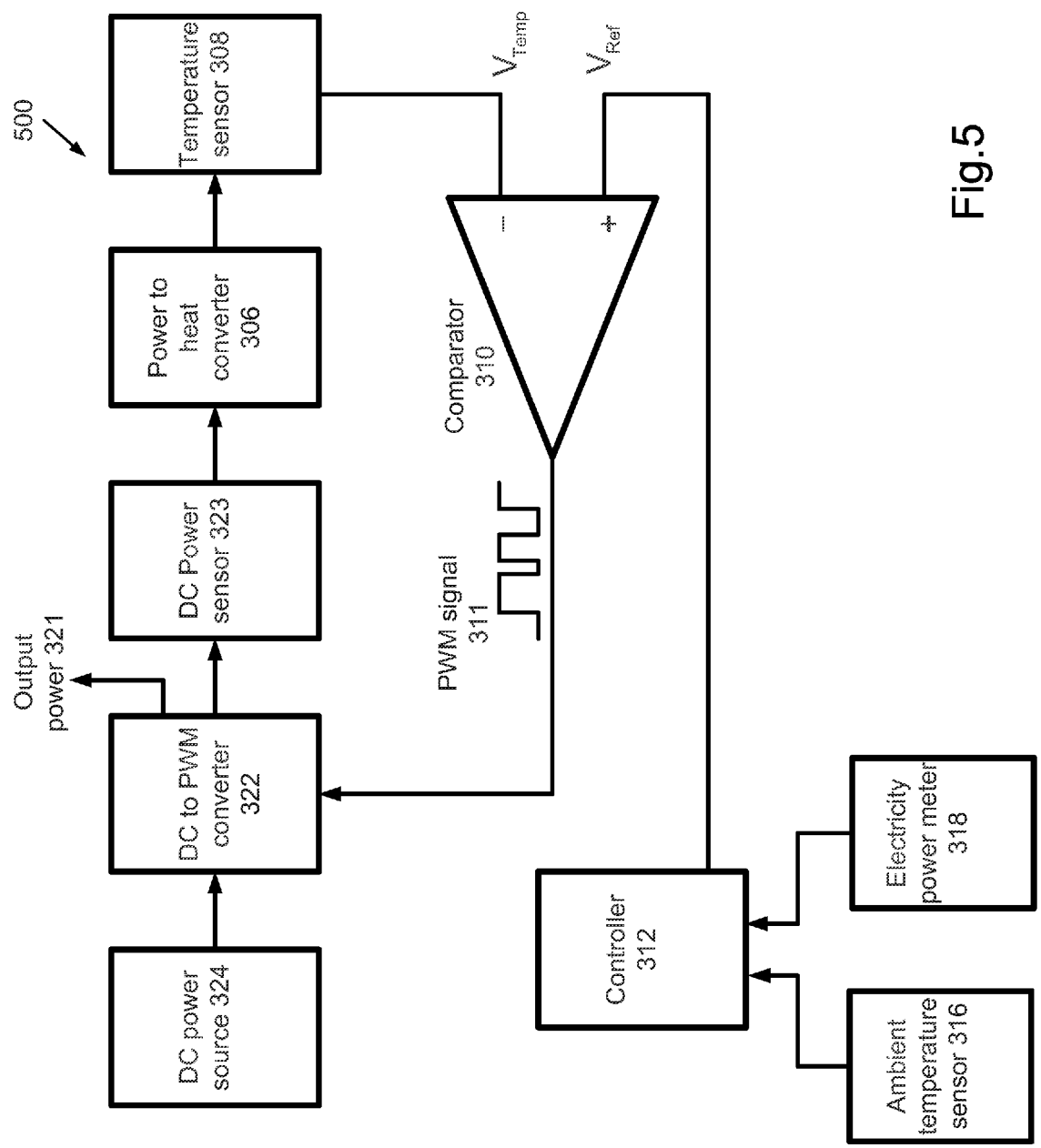
FIG. 5 shows, in a schematic diagram, an exemplary implementation of a DC power limiter with DC power source.

FIG. 5 shows an exemplary power limiter implemented in DC power domain with DC power source 324. Power limiter 500 is the same as power limiter 400 except that transformer 302 and AC.DC converter 320 are replaced by the DC power source 324.

While the invention has been disclosed with respect to a limited number of embodiments, numerous modifications and variations will be appreciated by those skilled in the art. Additionally, although the invention has been described particularly with respect to reducing power consumption of a power grid during peak demand period, it should be understood that the inventive concepts disclosed herein are also generally applicable to other power shortage situations including but not limited to shutdown of power generators because of accidents, natural disasters and terrorist attacks. The inventive concepts are also applicable to other power distribution systems such as micro-grids and power systems formed by alternative power sources. The present inventive concepts are applicable to any implementation of power limiters. It is intended that all such variations and modifications fall within the scope of the following claims:

The invention claimed is:

1. An electricity power limiter comprising:
   (a) a power sensor for receiving a predetermined portion of output power of a secondary winding of a transformer;
   (b) a converter for converting received power into heat through a heating element of a microstructure;
   (c) a temperature sensor for measuring temperature of the microstructure;
   (d) a comparator comprising a first input as the output of the temperature sensor, a second input as a reference signal generated from a controller and an output as a PWM (Pulse-Width Modulation) signal, wherein said reference signal generated by the controller is determined based upon at least a predetermined maximum output power of the secondary winding of the transformer;
   (e) a feedback loop connected between the output of the comparator and an input of a switch; and
   (f) said switch connected to the secondary winding in series for modulating the output power by said PWM signal.

2. The electricity power limiter as recited in claim 1, wherein said predetermined maximum output power is determined based upon an instruction transmitted from a control unit of a power grid through a communication network.

3. The electricity power limiter as recited in claim 1, wherein said reference signal generated by the controller is determined based additionally upon ambient temperature measured by a temperature sensor.

4. The electricity power limiter as recited in claim 1, wherein said reference signal generated by the controller is determined based additionally upon measured output of the secondary winding of the transformer by an electronic electricity meter.

5. The electricity power limiter as recited in claim 1, wherein at least said heating element and said temperature sensor are integrated in an integrated semiconductor circuit.

6. The electricity power limiter as recited in claim 5, wherein said integrated semiconductor circuit further comprises said switch and/or said comparator.

7. The electricity power limiter as recited in claim 1, wherein said switch further comprises either a Metal Oxide Semiconductor Field Effect Transistor (MOSFET) or a bipolar transistor.

8. The electricity power limiter as recited in claim 1, wherein said microstructure is manufactured by micromachining technology.

9. The electricity power limiter as recited in claim 1, wherein said power limiter further comprising a rectifier for converting received AC power from the secondary winding of the transformer into DC power before feeding into the heating element.

10. The electricity power limiter as recited in claim 1, wherein said heating element is a resistor.

11. An electricity power limiter comprising:
(a) a first converter for converting DC power to PWM (Pulse-Width Modulation) form;
(b) a power sensor for extracting a predetermined portion of the DC power;
(c) a second converter for converting the extracted DC power into heat through a heating element of a microstructure;
(d) a temperature sensor for measuring temperature of the microstructure;
(e) a comparator comprising a first input as the output of the temperature sensor, a second input as a reference signal generated from a controller and an output as PWM signal, wherein said reference signal generated by the controller is determined based upon at least a predetermined maximum output power of said power limiter; and
(f) a feedback loop connected between the output of the comparator and said first converter.

12. The electricity power limiter as recited in claim 11, wherein said power limiter further comprising an AC/DC converter if supply power is in AC form.

13. The electricity power limiter as recited in claim 11, wherein said predetermined maximum output power is determined based upon an instruction transmitted from a control unit of a power grid through a communication network.

14. The electricity power limiter as recited in claim 11, wherein said reference signal generated by the controller is determined based additionally upon ambient temperature measured by a temperature sensor.

15. The electricity power limiter as recited in claim 11, wherein said reference signal generated by the controller is determined based additionally upon measured output of the transformer by an electronic electricity meter.

16. The electricity power limiter as recited in claim 11, wherein at least said heating element and said temperature sensor are integrated in an integrated semiconductor circuit.

17. The electricity power limiter as recited in claim 16, wherein said integrated semiconductor circuit further comprises said switch and/or said comparator.

18. The electricity power limiter as recited in claim 11, wherein said microstructure is made by micromachining technology.

19. The electricity power limiter as recited in claim 11, wherein said DC power in PWM form may further be converted to DC power and/or to AC power before being delivered to appliances.

* * * * *